United States Patent Office 3,253,029
Patented May 24, 1966

3,253,029
METHOD FOR THE SEPARATION OF COF₂ AND HCl
Frank Shumate Fawcett, Wilmington, Del., assignor to E. I. du Pont de Nemours and Company, Wilmington, Del., a corporation of Delaware
No Drawing. Original application May 9, 1962, Ser. No. 193,624. Divided and this application Feb. 23, 1965, Ser. No. 434,687
3 Claims. (Cl. 260—544)

This application is a division of my copending application Serial No. 193,624, filed May 9, 1962.

The present invention relates to the separation of carbonyl fluoride from hydrogen chloride.

Carbonyl fluoride is employed as a starting material for the preparation of tetrafluoroethylene by reaction with carbon in a high temperature reactor such as an electric arc. Carbonyl fluoride is preferably obtained by reacting phosgene with hydrogen fluoride to result in a mixture of carbonyl fluoride and hydrogen chloride. Carbonyl fluoride and hydrogen chloride are separated only with great difficulty by distillation techniques because of their close boiling points ($COF_2$ B.P. $-83°$ C. and HCl B.P. $-85°$ C.) and because of formation of an azeotrope. Although chemical methods of separation are known, such methods add to the cost of producing carbonyl fluoride.

It is, therefore, the primary object of the present invention to provide means of separating carbonyl fluoride from hydrogen chloride which do not require a chemical reaction. Other objects will become apparent hereinafter.

In accordance with the present invention, mixtures of carbonyl fluoride with hydrogen chloride are resolved into mixtures rich in carbonyl fluoride and mixtures rich in hydrogen chloride by contacting said mixtures of carbonyl fluoride with hydrogen chloride with a separating agent selected from the class consisting of aliphatic nitriles of 2 to 8 carbon atoms and aromatic hydrocarbons of 6 to 10 carbon atoms. Examples of agents suitable for effecting the separation include acetonitrile, propionitrile, adiponitrile, benzene, toluene and xylenes.

By employing the separating agents of the present invention, the relative volatility of carbonyl fluoride to hydrogen chloride is altered such that a physical separation is possible. Thus, the separating agents increase the volatility of carbonyl fluoride with respect to the hydrogen chloride and cause hydrogen chloride to be removed preferentially from the gaseous mixture. Hydrogen chloride, retained with the separating agent, can be recovered from the separating agent by distillation using conditions of temperature or pressure or temperature and pressure which are different from the conditions used with the $COF_2$/HCl mixture. The separating agent from which the hydrogen chloride has been removed may be recycled. An alternative method for regenerating the separating agent is by heating it, passing an inert gas through the heated separating agent, thereafter washing with water and subjecting the washed separating agent to azeotropic drying.

The separation may be carried out by a variety of methods known to those skilled in the art. Thus, extractive or azeotropic distillation methods may be employed. The gaseous mixture may also be passed through a tower or agitated vessel containing the separating agent or it may be passed through a countercurrent contacting tower in which the gas mixture flows upward and the separating agent flows downward. The separation can be carried out batchwise or continuously in accordance with established techniques such that a complete separation of the two components of the mixture is obtained or that a complete separation is obtained in a series of steps in which one component is gradually removed, or the separation can be carried out such that one component is separated in pure form while the other component is enriched in the separating medium. The quantity of the separating agent will differ with the particular separating agent employed, the particular method employed and the temperature and pressure at which the sepaartion is carried out. In general, the quantity of separating agent is from 1 to 25 times by weight of the gaseous mixture to be separated. The temperature at which the separation is carried out may be varied widely, although temperatures from $-20$ to $+50°$ C. are preferred. The relative volatility of carbonyl fluoride to hydrogen chloride increases with decreasing temperatures and, hence, lower temperatures result in a higher degree of separation in a single pass.

Pressure is not a critical variable but for best results it is preferred to use pressures above atmospheric and thus increase the capacity of the equipment and reduce the cost of the separation.

The process of the present invention is further illustrated by the following examples:

*Example I*

A dry glass reactor was fitted with a stirrer, a thermometer, a reflux condenser cooled by solid carbon dioxide-acetone mixture, a cooling bath and a gas inlet tube. The exit from the top of the condenser was connected to a dry trap cooled in liquid nitrogen and then to a supply of helium. The apparatus was swept with helium and a blanketing atmosphere of this gas was maintained during the experiment.

In the reactor was placed 25 ml. of acetonitrile. During 30 minutes, 9 g. of a mixture of HCl and $COF_2$ (a portion of a mixture prepared from 86 g. of $COF_2$ and 91 g. of HCl) was introduced through a gas inlet tube below the surface of the stirred liquid, while the temperature of the liquid was maintained at 15–24° C. The unabsorbed gas which passed into the liquid nitrogen-cooled trap amounted to 6 g., and infrared analysis showed it to contain (on a molar basis) 65% $COF_2$, 5% $CO_2$, and a small amount of HCl.

The gas mixture used in the above experiment was prepared by introducing into a metal cylinder 86 g. of $COF_2$ and 91 g. of anhydrous HCl, giving a total of 177 g. of the mixture. The mixture was cooled in solid carbon dioxide, the liquid mixture thus obtained was agitated, and then allowed to warm to room temperature slowly with occasional agitation.

*Example II*

A 400 ml. pressure vessel was charged with 100 ml. of reagent grade toluene, then cooled in solid $CO_2$-acetone evacuated, and then there was added 25 g. of $COF_2$ and 15 g. of HCl (equimolar amounts). The reactor was closed and then brought to 30° C. with agitation at which point the pressure reached a steady value of 420 p.s.i.g. A 2 g. sample of gas taken from the gas phase was found by infrared analysis to contain approximately 65 mol percent $COF_2$ with the remainder (ca. 35 mol percent) largely HCl. A 48 g. portion of the liquid in the reactor was collected, and the gas evolved on reducing the pressure on this liquid sample to 1 atmosphere amounted to 7 g. Infrared analysis showed this gas recovered from the liquid layer to contain approximately 30 mol percent $COF_2$, with the balance (ca. 70 mol percent) being largely HCl. (Minor amounts of $CO_2$ (ca. 2%) and traces of COFCl and $COCl_2$ were also present in both samples.) These data for a single-stage operation thus show considerable enrichment of the $COF_2$ content in the gas phase over a toluene solution, while the HCl concentrates in the liquid (toluene) phase.

The toluene solvent after degassing at atmospheric pressure was further refined (e.g., for recycle) by washing it with water. A 41 ml. sample of the used toluene was washed successively with four fresh 41 ml. portions of distilled water and aliquots of the aqueous extracts were titrated with standard alkali to determine the amount of acidic components removed from the toluene. The results were as follows:

| Extract No.: | Equivalents of acid found in the extract |
|---|---|
| 1 | 0.0107 |
| 2 | 0.0007 |
| 3 | 0.0002 |
| 4 | 0.00008 |

The resulting toluene after four extractions was dried over anhydrous sodium sulfate to give a high recovery of purified toluene suitable for recycle or re-use in the process. The infrared spectrum of this recovered toluene was essentially identical to that of a reference sample of reagent grade toluene.

I claim:
1. A method for the separation of carbonyl fluoride from hydrogen chloride which comprises contacting a mixture of said compounds with a separation agent selected from the group consisting of aliphatic nitriles of 2 to 8 carbon atoms and aromatic hydrocarbons of 6 to 10 carbon atoms, said agent being liquid at separation conditions, and recovering a gaseous product which is enriched in carbonyl fluoride.

2. The method of claim 1 wherein the mixture is contacted with an aliphatic nitrile of 2 to 8 carbon atoms.

3. The method of claim 2 wherein the mixture is contacted with acetonitrile.

References Cited by the Examiner

UNITED STATES PATENTS

| 2,764,607 | 9/1956 | Hieserman et al. | 260—544 X |
| 2,836,622 | 5/1958 | Tullock | 260—544 |
| 3,142,535 | 7/1964 | Christoph | 260—544 X |

FOREIGN PATENTS 737,442   9/1955   Great Britain.

LORRAINE A. WEINBERGER, *Primary Examiner.*

R. K. JACKSON, *Assistant Examiner.*